(12) United States Patent
Itoh et al.

(10) Patent No.: US 12,509,304 B2
(45) Date of Patent: Dec. 30, 2025

(54) TRANSPORT ROLLER, CONVEYOR DEVICE, AND INCLINED CONVEYOR DEVICE

(71) Applicant: ITOH DENKI CO., LTD., Kasai (JP)

(72) Inventors: Kazuo Itoh, Kasai (JP); Tatsuhiko Nakamura, Kasai (JP); Koji Ueda, Kasai (JP); Atsushi Nishimura, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 156 days.

(21) Appl. No.: 18/277,251

(22) PCT Filed: Mar. 7, 2022

(86) PCT No.: PCT/JP2022/009655
§ 371 (c)(1),
(2) Date: Aug. 15, 2023

(87) PCT Pub. No.: WO2022/191113
PCT Pub. Date: Sep. 15, 2022

(65) Prior Publication Data
US 2024/0124244 A1    Apr. 18, 2024

(30) Foreign Application Priority Data
Mar. 8, 2021    (JP) .................. 2021-036689

(51) Int. Cl.
*B65G 39/06* (2006.01)
*B65G 39/04* (2006.01)
*B65G 39/12* (2006.01)

(52) U.S. Cl.
CPC ............. *B65G 39/06* (2013.01); *B65G 39/04* (2013.01); *B65G 39/12* (2013.01)

(58) Field of Classification Search
CPC ........ B65G 39/04; B65G 39/06; B65G 39/10; B65G 39/12; B65G 2207/42
See application file for complete search history.

(56) References Cited

U.S. PATENT DOCUMENTS 1,899,292 A * 2/1933 Rienks ................... A01D 17/06
                                                            209/632
2,618,385 A * 11/1952 Silver ..................... B07B 13/00
                                                            209/629

(Continued)

FOREIGN PATENT DOCUMENTS

EP    0410808 A2 *  1/1991
EP    1837298 A1     9/2007

(Continued)

OTHER PUBLICATIONS

International Search Report issued May 24, 2022 in International Patent Application No. PCT/JP2022/009655.

(Continued)

*Primary Examiner* — Gene O Crawford
*Assistant Examiner* — Keith R Campbell
(74) *Attorney, Agent, or Firm* — Wood, Phillips, Katz, Clark, & Mortimer (57) ABSTRACT

A conveying roller, a conveyor device, and an inclined conveyor for objects. A conveying roller comes into contact with an object and moves the object, the conveying roller including: a core member and a plurality of blade-shaped pieces, the blade-shaped piece being elastically deformable and being provided around the core member.

8 Claims, 9 Drawing Sheets

(56) References Cited

U.S. PATENT DOCUMENTS

| | | | |
|---|---|---|---|
| 4,823,689 A | 4/1989 | Kishino et al. | |
| 4,872,247 A * | 10/1989 | Nakamura | F16C 13/00 492/40 |
| 6,237,778 B1 * | 5/2001 | Weston | A01D 17/06 209/672 |
| 7,798,312 B2 * | 9/2010 | Brumm | B65G 39/07 198/779 |
| 8,683,918 B1 * | 4/2014 | Witham | A23N 15/02 426/481 |
| 8,800,781 B1 * | 8/2014 | Carlile, Jr. | B07B 1/155 403/204 |
| 2006/0070853 A1 | 4/2006 | Brumm | |
| 2010/0264069 A1 * | 10/2010 | Green | B07B 1/15 464/182 |
| 2012/0018403 A1 | 1/2012 | Ji et al. | |
| 2019/0300311 A1 | 10/2019 | Takayama et al. | |

FOREIGN PATENT DOCUMENTS

| | | |
|---|---|---|
| FR | 2 778 719 A1 | 11/1999 |
| JP | 48-105977 U1 | 12/1973 |
| JP | S57-23504 A | 2/1982 |
| JP | 57-085516 U1 | 5/1982 |
| JP | S 57126310 A | 8/1982 |
| JP | S59-127957 A | 7/1984 |
| JP | 62-064224 U1 | 4/1987 |
| JP | S 62251521 A | 11/1987 |
| JP | 2000095321 A | 4/2000 |
| JP | 2005-170595 A | 6/2005 |
| JP | 2008-156068 A | 7/2008 |
| JP | 2010-241557 A | 10/2010 |
| JP | 2018135180 A | 8/2018 |
| JP | 2018-154423 A | 10/2018 |
| WO | 2016/066838 A1 | 5/2016 |

OTHER PUBLICATIONS

International Preliminary Report on Patentability and Written Opinion of the International Searching Authority from the International Bureau of WIPO, for International Patent Application No. PCT/JP2022/009655, issued on Sep. 12, 2023, pp. 1-6.

Supplementary European Search Report, issued Jan. 15, 2025, in European Patent Application No. EP 22 276 7069.

* cited by examiner

TRANSPORT ROLLER, CONVEYOR DEVICE, AND INCLINED CONVEYOR DEVICE

BACKGROUND OF THE INVENTION

Field of the Invention

The present invention relates to a conveying roller used in a conveyor device. The present invention also relates to a conveyor device and an inclined conveyor device using a conveying roller.

Background Art

A roller conveyor device is one of conveyor devices. In the roller conveyor device, conveying rollers are arranged parallel to each other between frames arranged in parallel.

The roller conveyor device rotates the conveying roller with power, thereby applying force to an object on the conveying rollers to move the object.

Patent Document 1: JP 2018-135180 A

The conveying roller of the prior art is composed of a metal tube, and rotates the metal tube to move a conveyance part.

The conveying roller of the prior art is made of metal and thus has a hard surface. Therefore, when an object is input, there is a concern that the object may be damaged. In addition, sound may be generated when an object collides with the conveying roller.

In particular, when the conveyor device is used in an inclined posture, there is a concern that sound will be generated or an object will be damaged.

For example, there is a case where there is a conveyor line on an upper floor, there is also a conveyor line on a lower floor, and a conveyor device is installed in an inclined posture between the upper floor and the lower floor. For convenience of description, a conveyor device installed in an inclined posture is referred to as an inclined conveyor device.

For example, when an object is moved from an upper floor to a lower floor, the object is conveyed to an end portion on the upper floor side of the inclined conveyor device by the conveyor line of the upper floor. Then, the inclined conveyor device is driven to bring down the object onto the conveyor line of the lower floor.

Here, while the conveying surface of the inclined conveyor device is inclined, the conveying surface of the conveyor line installed on the lower floor is horizontal. Therefore, an angle is generated between the conveying surface of the inclined conveyor device and the delivery surface of the conveyor line of the lower floor, and when the conveyance part is delivered from the inclined conveyor device to the conveyor device on the lower floor, a corner of an object angle may hit the delivery surface of the conveyor line of the lower floor.

As a result, sound may be generated, or the object may be damaged.

SUMMARY OF THE INVENTION

The present invention addresses the above-described problems of the prior art, and an object thereof is to provide a conveying roller, a conveyor device, and an inclined conveyor that soften an impact of collision or the like and that are unlikely to generate collision noise or damage an object.

An aspect for solving the above problem is a conveying roller that comes into contact with an object and moves the object, including: a core member; and a plurality of blade-shaped pieces elastically deformable and provided around the core member.

In the conveying roller of the present aspect, the plurality of blade-shaped pieces are provided on the core member, and the blade-shaped pieces rotate to move the object.

Since the blade-shaped piece is elastically deformable, the blade-shaped piece is easily deformed when an object collides with the blade-shaped piece and softens an impact of the collision. Therefore, even when the object collides, sound is less likely to be generated. Further, the conveyance part is unlikely to be damaged.

In the above-described aspect, desirably, the blade-shaped piece has a thin plate shape, one end of the blade-shaped piece being joined to the core member, the other end of the blade-shaped piece being a free end.

According to the present aspect, the deformability of the blade-shaped piece is high, and the action of softening the impact of the collision is strong.

In the above-described aspect, desirably, the blade-shaped piece has a curved cross-sectional shape, the free end of the blade-shaped piece being located at a position overlapping an adjacent blade-shaped piece and/or at a position covering a part of the adjacent blade-shaped piece.

According to the present aspect, the blade-shaped pieces are distributed without gaps therebetween in the circumferential direction. Therefore, an impact applied to the object is small.

In each of the above-described aspects, desirably, the blade-shaped pieces are arranged at regular intervals around the core member, and in a shaft direction the conveying roller includes a region having the blade-shaped pieces with a shifted arrangement phase.

According to the present aspect, the chances of holding any part of the object with any one of the blade-shaped pieces are increased.

In each of the above-described aspects, desirably, a plurality of roller pieces are provided, the roller piece including: a shaft portion; and the blade-shaped pieces, the blade-shaped pieces being provided on the shaft portion.

According to the present aspect, the total length of the conveying roller can be changed by changing the number of roller pieces, and the conveying rollers having a plurality of lengths can be manufactured with a small number of types of components. Therefore, the conveying roller of the present aspect has high compatibility of components.

In the above-described aspect, desirably, the plurality of roller pieces include: a first roller piece; and a second roller piece adjacent to the first roller piece, the first roller piece including: a first shaft portion; and first blade-shaped pieces, the first blade-shaped pieces being provided on the first shaft portion, the second roller piece including: a second shaft portion; and second blade-shaped pieces, the second blade-shaped pieces being provided on the second shaft portion, the first roller piece further includes a first engagement unit, and the second roller piece further includes a second engagement unit, the first engagement unit being engaged with the second engagement unit for alignment, and when the first engagement unit is engaged with the second engagement unit, an arrangement phase of the first blade-shaped pieces is configured to be shifted from an arrangement phase of the second blade-shaped pieces.

According to the present aspect, the chances of holding any part of the object with any one of the blade-shaped pieces are increased.

Another aspect for solving the above-described problem is a conveying roller that comes into contact with an object and moves the object, including: a core member; and a deformation unit elastically deformable and provided around the core member.

In the conveying roller of the present aspect, the deformation unit is provided on the core member, and the object is moved by the rotation of the deformation unit.

The deformation unit is easily deformed when the object collides with the deformation unit, and softens the impact of the collision. Therefore, even when the object collides, the conveyance part is unlikely to be damaged.

In each of the above-described aspects, desirably, a plurality of roller pieces are provided, the roller piece including: a shaft portion; and the deformation unit, the deformation unit being provided on the shaft portion.

According to the present aspect, the total length of the conveying roller can be changed by changing the number of roller pieces, and the conveying rollers having a plurality of lengths can be manufactured with a small number of types of components. Therefore, the conveying roller of the present aspect has high compatibility of components.

In each of the above-described aspects, desirably, the conveying roller includes in a shaft direction: a force-applying region contributing to conveyance of the object; and a void region not contributing to conveyance of the object.

According to the present aspect, when the conveying rollers are arranged in parallel, the inter-shaft distance between the conveying rollers can be shortened.

In each of the above-described aspects, a plurality of roller pieces are provided, the roller piece including: a force-applying region contributing to conveyance of the object; and a void region not contributing to conveyance of the object.

According to the present aspect, when the conveying rollers are arranged in parallel, the inter-shaft distance between the conveying rollers can be shortened.

According to another aspect, provided is a conveyor device including the conveying rollers according to any of the descriptions above are arranged in parallel.

According to the present aspect, when the object collides, the conveying roller is easily deformed, and the impact of the collision is softened. Therefore, even when the object collides, the conveyance part is unlikely to be damaged.

In the above-described aspect, desirably, the conveyor device includes: a first conveying roller; and a second conveying roller adjacent to the first conveying roller, the first conveying roller includes: a first large-diameter portion; and a first small-diameter portion, and the second conveying roller includes: a second large-diameter portion; and a second small-diameter portion, the first large-diameter portion being located at a position corresponding to the second small-diameter portion, the first small-diameter portion being located at a position corresponding to the second large-diameter portion, and an inter-shaft distance between the first and the second conveying rollers is shorter than a diameter of the first large-diameter portion and that of the second large-diameter portion.

According to the present aspect, the conveying rollers can be densely arranged. Therefore, there are many chances of contact between the object and the conveying roller, and the object is less likely to rattle.

An aspect related to the inclined conveyor is an inclined conveyor device installed in an inclined posture, including: an intermediate region; and at least one of an upper-end region and a lower-end region, wherein the conveyor device according to any of the descriptions above is provided in the at least one of an upper-end region and a lower-end region.

According to the present aspect, the impact applied to the object is small.

Another aspect for solving the same problem is a conveyor device including conveying rollers arranged in parallel, wherein the conveying rollers include: a first conveying roller; and a second conveying roller adjacent to the first conveying roller, wherein the first conveying roller includes: a first large-diameter portion; and a first small-diameter portion, and the second conveying roller includes: a second large-diameter portion; and a second small-diameter portion, the first large-diameter portion being located at a position corresponding to the second small-diameter portion, the first small-diameter portion being located at a position corresponding to the second large-diameter portion, and wherein an inter-shaft distance between the first and the second conveying rollers is shorter than a diameter of the first large-diameter portion and that of the second large-diameter portion.

According to the present aspect, the conveying rollers can be densely arranged. Therefore, there are many chances of contact between the object and the conveying roller, and the object is less likely to rattle. Therefore, an impact applied to the object is small.

The conveying roller, the conveyor device, and the inclined conveyor of the present aspect may have an effect of softening the impact and being unlikely to damage the object.

DETAILED DESCRIPTION OF THE PREFERRED EMBODIMENTS

Hereinafter, an embodiment of the present invention will be described.

A conveying roller 1 of the present embodiment is a member constituting a conveying surface of conveyor devices 50 and 51 as illustrated in FIGS. 6A to 8.

Figure 1:
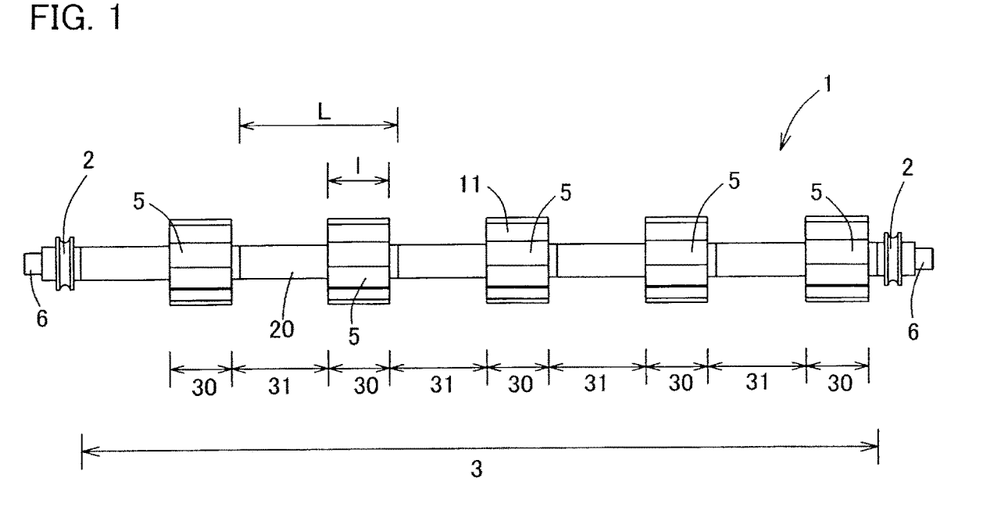
FIG. 1 is a front view of a conveying roller according to an embodiment of the present invention.

As illustrated in FIG. 1, the conveying roller 1 has pulleys 2 at both ends and a conveyance part 3 at an intermediate portion.

Figure 2:
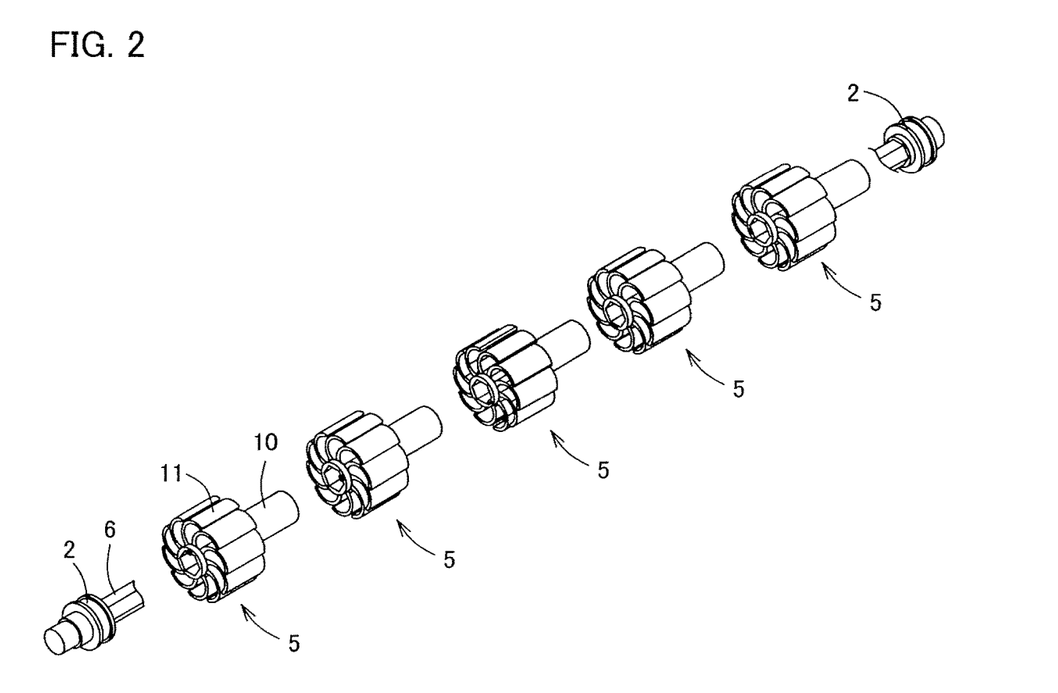
FIG. 2 is an exploded perspective view of the conveying roller of FIG. 1.

As illustrated in FIGS. 1 and 2, the conveyance part 3 is formed by connecting a plurality of roller pieces 5 in series and inserting the rotating core 6 through each of the roller pieces 5.

The roller piece 5 is formed of resin. As illustrated in FIGS. 3A to 4B, the roller piece 5 has a short rotating core component (shaft portion) 10, and a deformation unit is provided around a partial region in the longitudinal direction. The deformation unit of the present embodiment is a blade-shaped piece 11, and a plurality of the blade-shaped pieces 11 are provided.

The rotating core component 10 (shaft portion) is a short pipe and is provided with a through-hole 12. In the present embodiment, the cross-sectional shape of the through-hole 12 is hexagonal. The cross-sectional shape of the through-hole 12 is not limited to a hexagonal shape, and it may be sufficient that there is a part engaged with the rotating core 6.

Each of the blade-shaped pieces 11 has a thin plate shape, and is bent and curved. The blade-shaped piece 11 employed in the present embodiment has an arcuate cross-sectional shape. The blade-shaped piece 11 has an arc of approximately 180 degrees. The angle of the arc of the blade-shaped piece 11 is desirably 90 degrees or more. In addition, the angle of the arc of the blade-shaped piece 11 is desirably 270 degrees or less.

The diameter of the arc of the blade-shaped piece 11 is recommended to be 50% to 200% of the diameter of the rotating core component 10 (shaft portion).

In the present embodiment, the diameter of the arc of the blade-shaped piece 11 is equal to the diameter of the rotating core component 10.

One end side of the blade-shaped piece 11 is connected to the rotating core component (shaft portion) 10, and the other end side is a free end. Therefore, the blade-shaped piece 11 is attached to the rotating core component 10 in a cantilever manner. Therefore, the blade-shaped piece 11 is easily elastically deformed when receiving an external force. That is, when a load is applied from the outside, the free end side is elastically deformed, and is bent toward the rotating core component 10.

The blade-shaped pieces 11 are radially arranged with respect to the rotating core component 10. In addition, the blade-shaped piece 11 is densely arranged around the rotating core component 10. That is, when attention is paid to the base end portion of each blade-shaped piece 11, the gap between the adjacent blade-shaped pieces 11 is extremely small.

The blade-shaped piece 11 is provided in a posture in which the rotating core component 10 side is recessed.

As illustrated in FIGS. 3A to 4B, the free end side of the blade-shaped piece 11 covers a part from the base end to the center region of the adjacent blade-shaped piece 11. In the present embodiment, when the object is placed in the vicinity of the free end of one blade-shaped piece 11, the blade-shaped piece 11 bends and hits the lower blade-shaped piece 11, and the lower blade-shaped piece 11 can also bear the load of the object. Therefore, excessive deformation of the blade-shaped piece 11 can be prevented.

In the present embodiment, the free end of the blade-shaped piece 11 is separated from the adjacent blade-shaped piece 11, but the free end of the blade-shaped piece 11 may be in contact with the adjacent blade-shaped piece 11.

The region where the blade-shaped piece 11 is provided is a part near one end of the rotating core component (shaft portion) 10. The length 1 of the region where the blade-shaped piece 11 is provided is half or less of the total length L of the rotating core component 10.

The length 1 of the region where the blade-shaped piece 11 is provided is desirably approximately 30% to 45% of the total length L of the rotating core component 10.

As illustrated in FIGS. 3A to 4B, engaging units 15 and 16 are provided at both ends of the rotating core component 10.

Figure 3A:
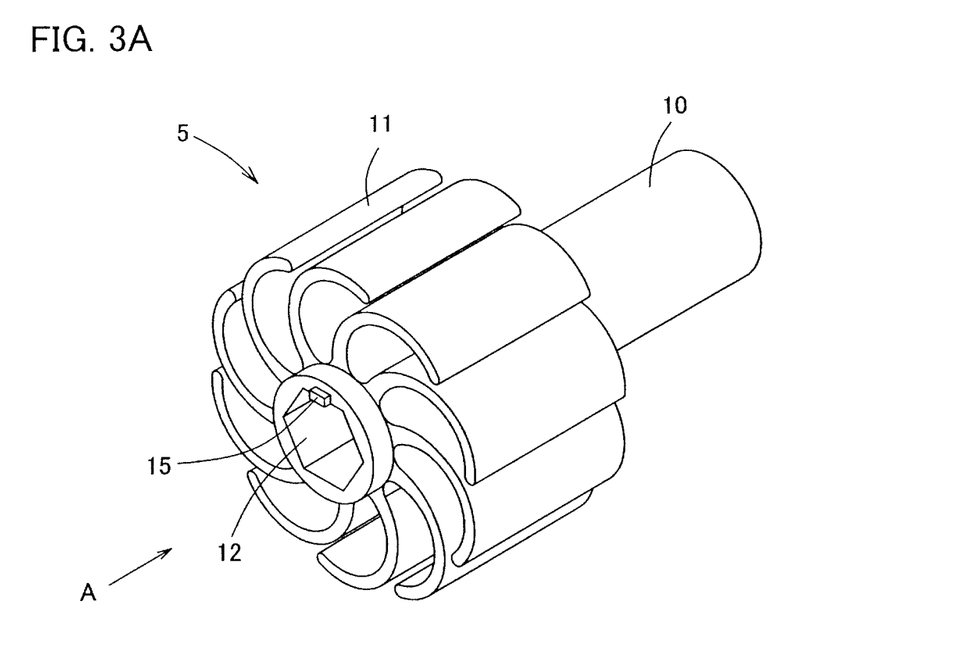
FIG. 3A is a perspective view of a roller piece observed from a front side.
Figure 3B:
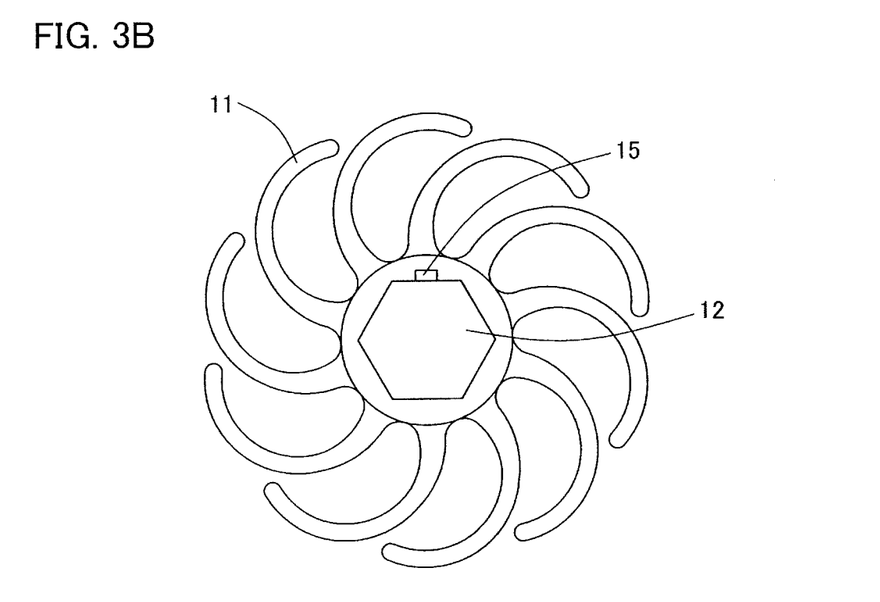
FIG. 3B is a view when viewed in the direction of arrow A.
Figure 4A:
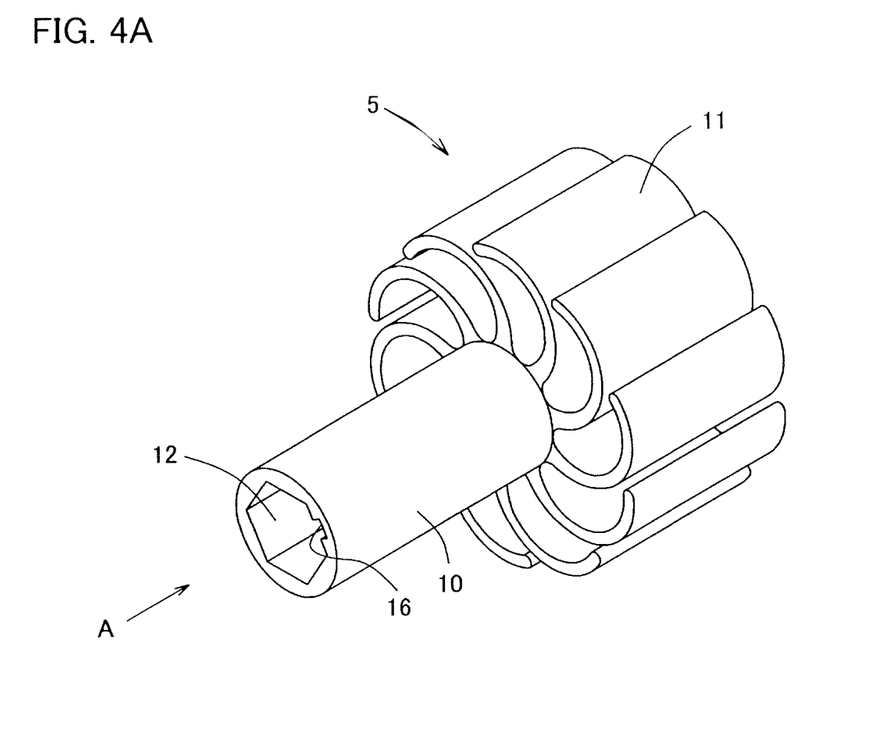
FIG. 4A is a perspective view of a roller piece observed from a back side.
Figure 4B:
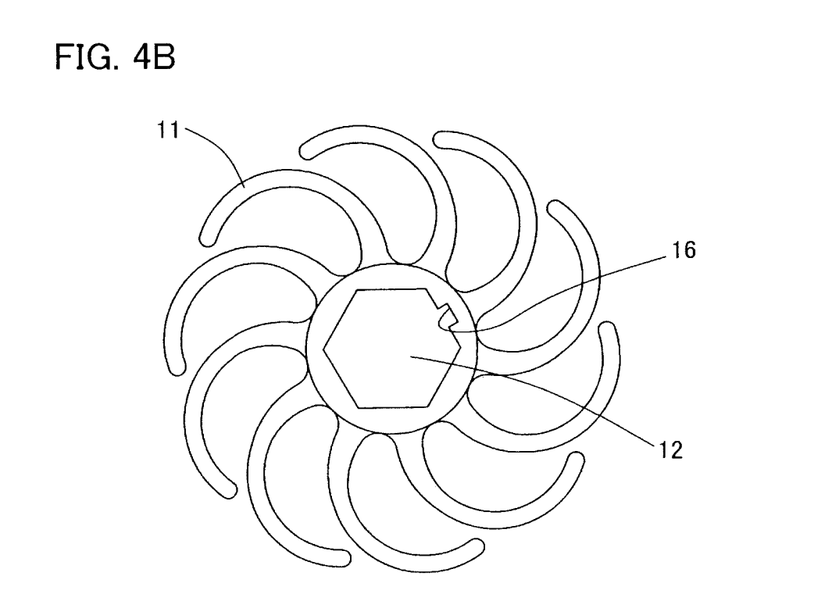
FIG. 4B is a view when viewed in the direction of arrow A.

The engaging unit 15 on the front surface side (the blade-shaped piece 11 side) is a protrusion as illustrated in FIGS. 3A and 3B, and the engaging unit 16 on the back surface side (the blade-shaped piece 11 side) is a recess portion as illustrated in FIGS. 4A and 4B.

The angles of the engaging units 15 and 16 with respect to the rotating core component 10 are different as illustrated in FIGS. 3A to 4B.

In the present embodiment, while the engaging unit 15 on the front side (the blade-shaped piece 11 side) is located at the root of the blade-shaped piece 11 as illustrated in FIGS. 3A and 3B, the engaging unit 16 on the back side (the blade-shaped piece 11 side) is located between the roots of the two blade-shaped pieces 11.

Figure 5:
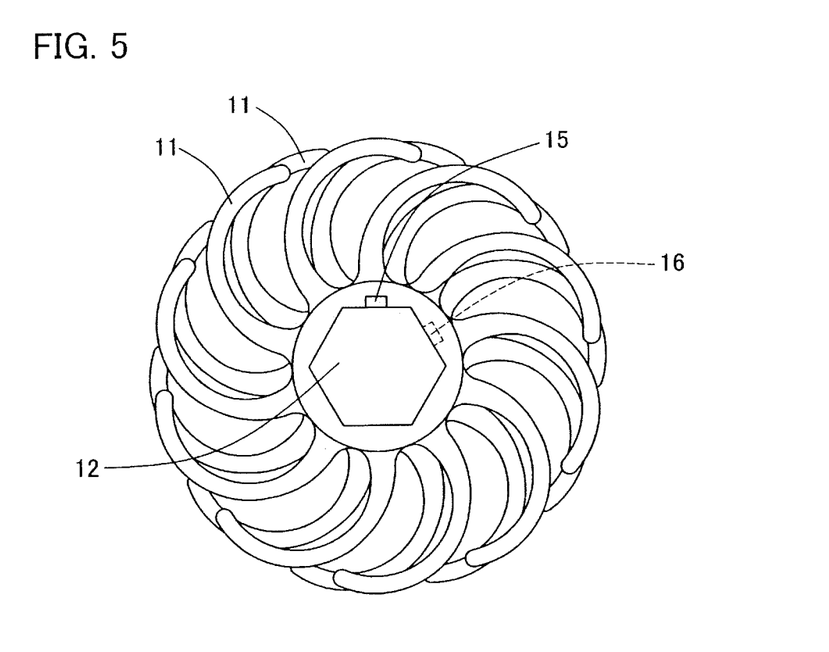
FIG. 5 is a front view of a combination of two roller pieces observed from the front side.

Therefore, when the engaging units 15 and 16 are combined to couple the two roller pieces 5, the position of the blade-shaped piece 11 is shifted as illustrated in FIG. 5.

That is, the engaging units 15 and 16 are for alignment, and when the engaging units 15 and 16 are matched, the phases of the arrangement of the blade-shaped pieces 11 of the adjacent roller pieces 5 are shifted.

As illustrated in FIGS. 1 and 2, in the conveying roller 1, the plurality of roller pieces 5 are coupled to each other to make the rotating core components 10 communicate with each other, thereby forming a series of core members 20, and the hexagonal rotating core 6 is inserted into the through-hole 12.

The pulleys 2 are attached to both ends of the rotating core 6.

When the conveyance part 3 of the conveying roller 1 is viewed, a region where the blade-shaped piece 11 is provided in the core member 20 and a region where the blade-shaped piece 11 is not present, are alternately present.

The region where the blade-shaped piece 11 is provided in the core member 20 is a large-diameter portion 30 having a large apparent diameter, and the region where the blade-shaped piece 11 is not present is a small-diameter portion 31 having a small apparent diameter.

In the conveying roller 1 of the present embodiment, the large-diameter portion 30 and the small-diameter portion 31 are alternately present in the shaft direction.

The large-diameter portion 30 is a part that comes into contact with the object, and is a force-applying region that contributes to the conveyance of the object. The small-diameter portion 31 is a void region that does not come into contact with the object and does not contribute to the conveyance of the object.

The conveying roller 1 includes a plurality of large-diameter portions (force-applying regions) 30, some of which show the shifted positions of the blade-shaped pieces 11.

Figure 6A:
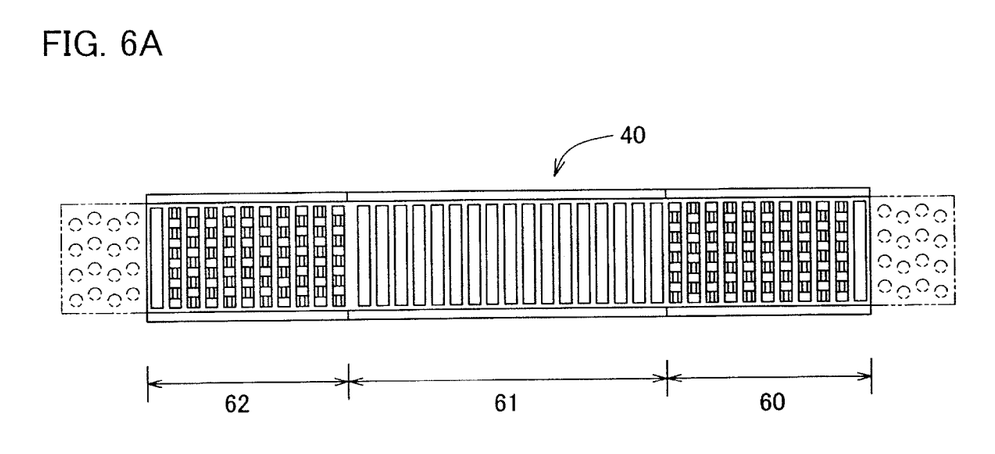
FIG. 6A is a plan view and FIG. 6B is a side view of an inclined conveyor device according to the embodiment of the present invention.
Figure 6B:
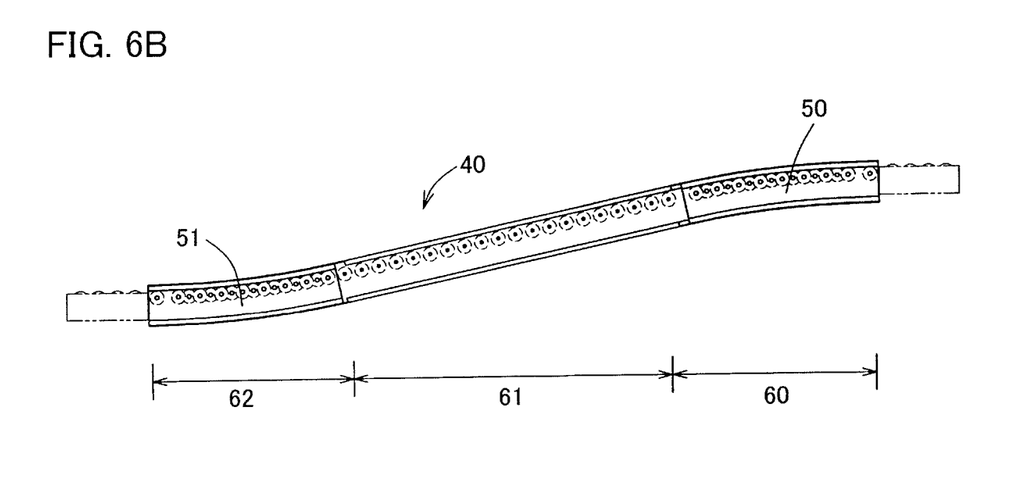

FIG. 6 illustrates an inclined conveyor device 40 according to an embodiment of the present invention.

As illustrated in FIG. 6, the inclined conveyor device 40 is divided into three regions.

That is, the inclined conveyor device 40 is divided into an upper end region 60, an inclined region 61, and a lower end region 62.

In the present embodiment, the upper end region 60, the inclined region 61, and the lower end region 62 are different conveyor devices, and the conveying roller 1 of the present embodiment is used for the upper end region 60 and the lower end region 62.

In the inclined conveyor device 40 of the present embodiment, the conveying surfaces of the upper conveyor device 50 constituting the upper end region 60 and the lower conveyor device 51 constituting the lower end region 62 are both bent.

Specifically, in the upper conveyor device 50, the conveying rollers 1 are arranged such that the conveying surface is projected upward. In the lower conveyor device 51, the conveying rollers 1 are arranged such that the conveying surface is projected upward.

Figure 7A:
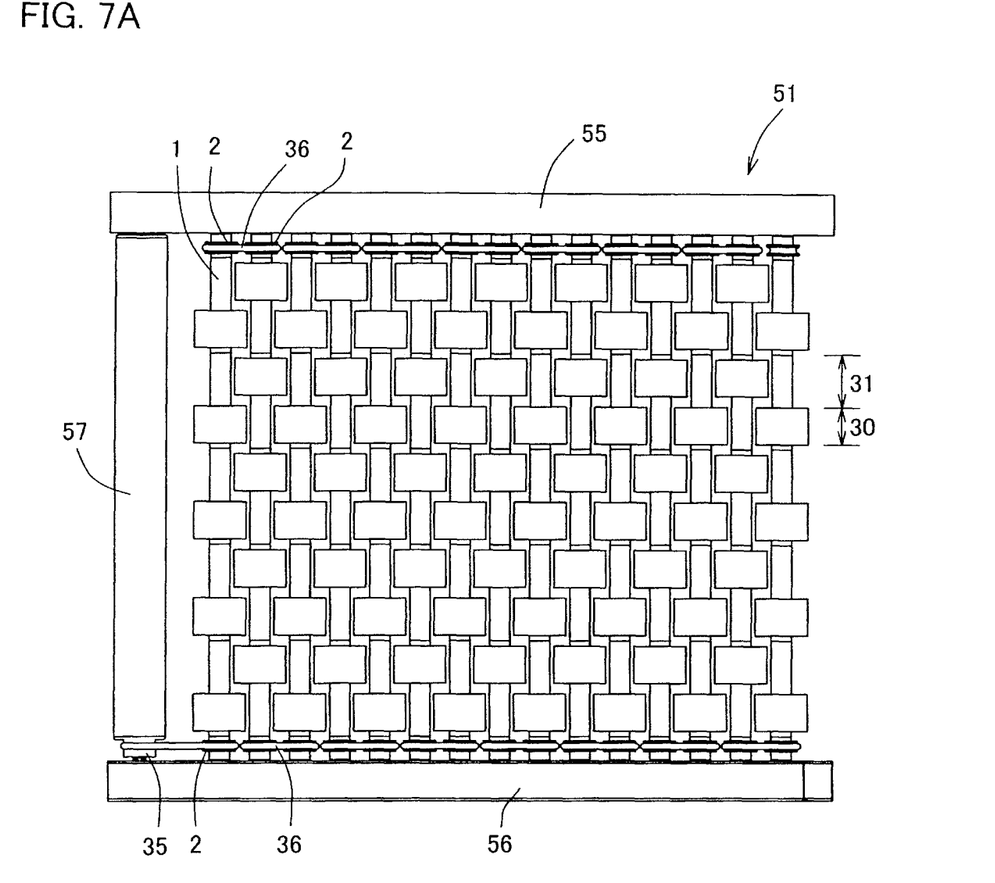
FIG. 7A is a plan view and FIG. 7B is a side view of a conveyor device constituting a lower region of the inclined conveyor device illustrated in FIGS. 6A and 6B.
Figure 7B:
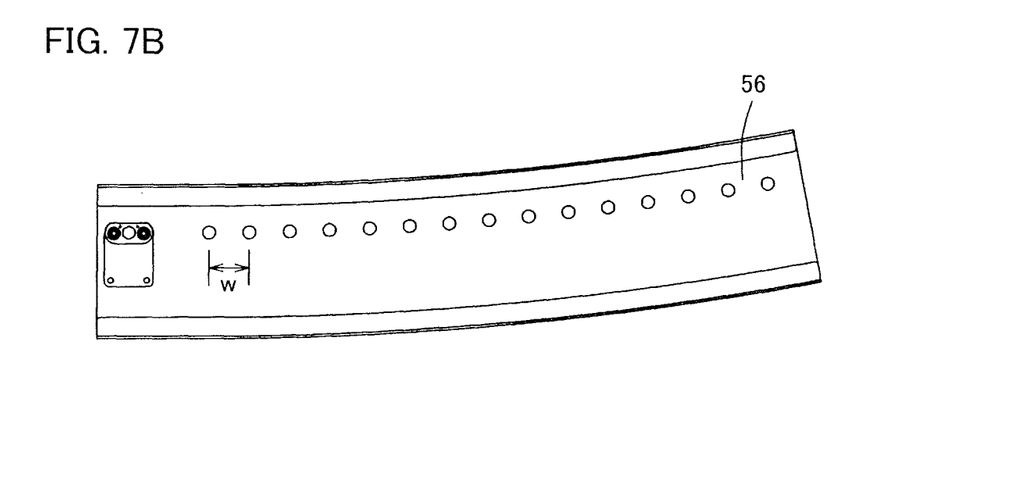
Figure 8:
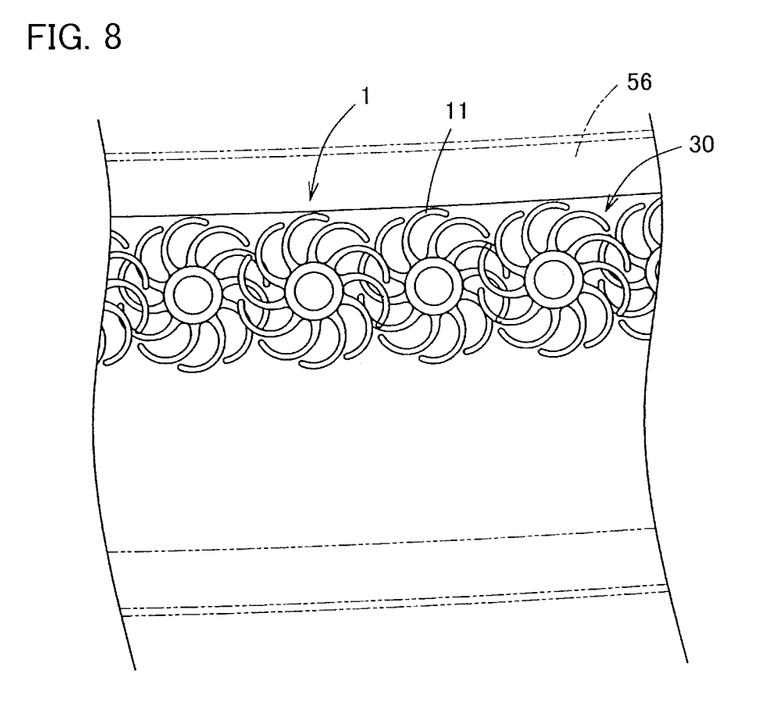
FIG. 8 is an enlarged cross-sectional side view of the inclined conveyor device illustrated in FIGS. 6A and 6B.

Taking the lower conveyor device 51 as an example, in the lower conveyor device 51, a motor-incorporating roller 57 and the plurality of conveying rollers 1 are arranged in parallel to each other on frames 55 and 56 arranged in parallel.

As illustrated in FIG. 7B, the frames 55 and 56 are bent in a downwardly projected shape.

The motor-incorporating roller 57 is attached to one end of each of the frames 55 and 56.

In the other region, the plurality of conveying rollers 1 are arranged in parallel. Specifically, the plurality of conveying rollers 1 are attached to each other in parallel.

In the present embodiment, in the adjacent conveying rollers 1, the position of the large-diameter portion 30 and the position of the small-diameter portion 31 are in a staggered relationship.

That is, when attention is paid to the specific conveying roller 1, the position of the small-diameter portion 31 of the adjacent conveying roller 1 corresponds to the position of the large-diameter portion 30 of the specific conveying roller 1, and the position of the large-diameter portion 30 of the adjacent conveying roller 1 corresponds to the position of the small-diameter portion 31 of the specific conveying roller 1.

The inter-shaft distance W between the adjacent conveying rollers 1 is shorter than the diameter of the large-diameter portion 30.

Therefore, the large-diameter portion 30 and the small-diameter portion 31 of the adjacent conveying rollers 1 are in a state of being inserted to each other.

That is, when attention is paid to the specific conveying roller 1, the large-diameter portion 30 of the adjacent conveying roller 1 enters between the large-diameter portions 30 of the specific conveying roller 1, and the outline of the large-diameter portion 30 of the adjacent conveying roller 1 approaches the vicinity of the core member 20 of the specific conveying roller 1.

Therefore, in the lower conveyor device 51, as illustrated in FIG. 7A, the blade-shaped pieces 11 are densely arranged, and the entire surface of the lower conveyor device 51 functions as a conveying surface. In other words, in the lower conveyor device 51, the entire surface is the force-applying region.

In the present embodiment, each conveying roller 1 is driven by the motor-incorporating roller 57 as a power source.

That is, the motor-incorporating roller 57 is provided with a driving pulley 35, and the belt 36 is suspended between the driving pulley 35 and one pulley 2 of the adjacent first conveying roller 1.

The belt 36 is suspended between the other pulley 2 of the first conveying roller 1 and the pulley 2 of the adjacent second conveying roller 1.

In this manner, the belt 36 is sequentially suspended between the adjacent conveying rollers 1, and all the conveying rollers 1 rotate by rotating the motor-incorporating roller 57.

In the present embodiment, the conveying roller 1 rotates in a direction in which the base end side of the blade-shaped piece 11 is the front and the free end side is the back. The direction (winding direction) of the blade-shaped piece 11 and the rotation direction of the conveying roller 1 are not limited, and may be reversed. Further, the blade-shaped pieces 11 having different winding directions may exist together.

Assuming that the object is lowered from the upper floor to the lower floor, in the inclined conveyor device 40, the conveying surface of the upper conveyor device 50 is bent in an upwardly projected shape, and the conveying surface of the connection part to the inclined region 61 has a gentle curved surface, and thus the object is smoothly transferred to the inclined region 61.

In addition, in the inclined conveyor device 40 employed in the present embodiment, the conveying surface of the lower conveyor device 51 is bent in a downwardly projected shape, and the conveying surface of the connection part from the inclined region 61 has a gentle curved surface, and thus the object is smoothly transferred from the inclined region 61 to the lower conveyor device 51.

In addition, in the lower conveyor device 51, as illustrated in FIG. 7A, the blade-shaped pieces 11 are densely arranged, and the entire surface of the lower conveyor device 51 functions as a conveying surface. Therefore, there are many chances of contact between the object and the conveying roller 1, and the object is less likely to rattle when the object is delivered from the inclined region 61 to the lower end region 62.

In particular, in the present embodiment, the conveying roller 1 includes a plurality of large-diameter portions (force-applying regions) 30, and among these, those in which the positions of the blade-shaped pieces 11 are shifted exist together. Therefore, when the object reaches the lower conveyor device 51 and comes into contact with any one of the conveying rollers 1, the object is supported by any one of the blade-shaped pieces 11. Therefore, when the object is delivered from the inclined region 61 to the lower end region 62, the object is less likely to rattle.

Furthermore, in a case where the corner of the object collides with the lower conveyor device 51 when the object is delivered from the inclined region 61 to the lower end region 62, the blade-shaped piece 11 of the conveying roller 1 is deformed and absorbs the impact.

That is, since the blade-shaped piece 11 is bent and surrounds the periphery of the core member without a gap, the corner of the object hits any of the blade-shaped pieces 11. Since the blade-shaped piece 11 is attached in a cantilever manner, it is easy to bend and has high deformability. Therefore, in a case where the corner of the object collides with the lower conveyor device 51, the blade-shaped piece 11 of the conveying roller 1 is deformed and absorbs the impact.

Therefore, the object is hardly damaged. In addition, less sound is generated.

In the embodiment described above, the plurality of conveying rollers 1 are rotated using the motor-incorporating roller 57 as a power source, but any power source of the conveying roller 1 may be employed. For example, a geared motor or the like may be used as a power source. Alternatively, the motor-incorporating roller 57 may be a core member, and a blade-shaped piece may be provided on the roller body of the motor-incorporating roller 57 to form a conveying roller.

In the embodiment described above, the pulleys 2 are provided at both ends of the conveying roller 1, and the belt 36 is suspended between the adjacent conveying rollers 1 to sequentially transmit the power, but a plurality of pulleys may be provided on one of the conveying rollers 1, and the belt 36 may be suspended between the adjacent conveying rollers 1 to sequentially transmit the power.

In the embodiment described above, the power is transmitted to each conveying roller 1 by the belt 36, but the power transmitting mechanism is not limited to the belt. For example, a gear or a chain may be used.

In the embodiment described above, the rotating core 6 engaged with the through-hole 12 is inserted into the through-hole 12 of the rotating core component 10 (shaft portion), and the blade-shaped piece 11 is rotated by rotating the rotating core 6 with power, but the rotating core component 10 (shaft portion) may be freely rotatable with respect to the shaft core, and the rotational force may be transmitted to the core member 20 configured by the rotating core component 10 (shaft portion).

The conveying roller 1 described above is configured by connecting the plurality of roller pieces 5 in series. According to the structure of the present embodiment, the conveying rollers 1 having different lengths can be made by increasing or decreasing the number of the roller pieces 5, and the compatibility of the components is high.

The number of roller pieces 5 is desirably four or more. That is, in the conveyor devices 50 and 51 of the present embodiment, the positions of the blade-shaped pieces 11 of the adjacent roller pieces 5 are shifted, and the phases are different. On the other hand, in the roller piece 5 at one skipping position, the positions of the blade-shaped pieces 11 match each other and are in the same phase.

Therefore, when the number of the roller pieces 5 is four or more, the object is simultaneously supported by the blade-shaped pieces 11 of the plurality of roller pieces 5. Therefore, the object is less likely to rattle.

However, the present invention is not limited to this configuration, and the whole may be integrally molded.

In the above-described conveying roller 1, a region where the blade-shaped piece 11 is provided in the core member 20 and a region where the blade-shaped piece 11 is not present, are alternately present.

According to the present configuration, when incorporated in the conveyor device, the inter-shaft distance between the conveying rollers 1 can be shortened, and the force-applying region contributing to the conveyance of the object can be densely provided.

That is, the part which is actually in contact with the object is a part located at the uppermost position of the force-applying region during rotation. Therefore, a valley is formed between the adjacent force-applying regions.

In the conveyor devices 50 and 51 of the present embodiment, the large-diameter portions 30 and the small-diameter portions 31 of the adjacent conveying rollers 1 are in a state of being inserted to each other, the parts actually contributing to the conveyance are arranged in a zigzag pattern, and thus there are many chances of contact with the object, and the object is less likely to rattle.

However, the present invention is not limited to this configuration, and the blade-shaped piece 11 may be provided in the entire region in the shaft direction of the conveying roller 1.

The conveying rollers 1 employed in the conveyor devices 50 and 51 described above are all formed by connecting the roller pieces 5 having the same shape, but conveying rollers using the roller pieces 5 having different shapes may exist together.

Figure 9A:
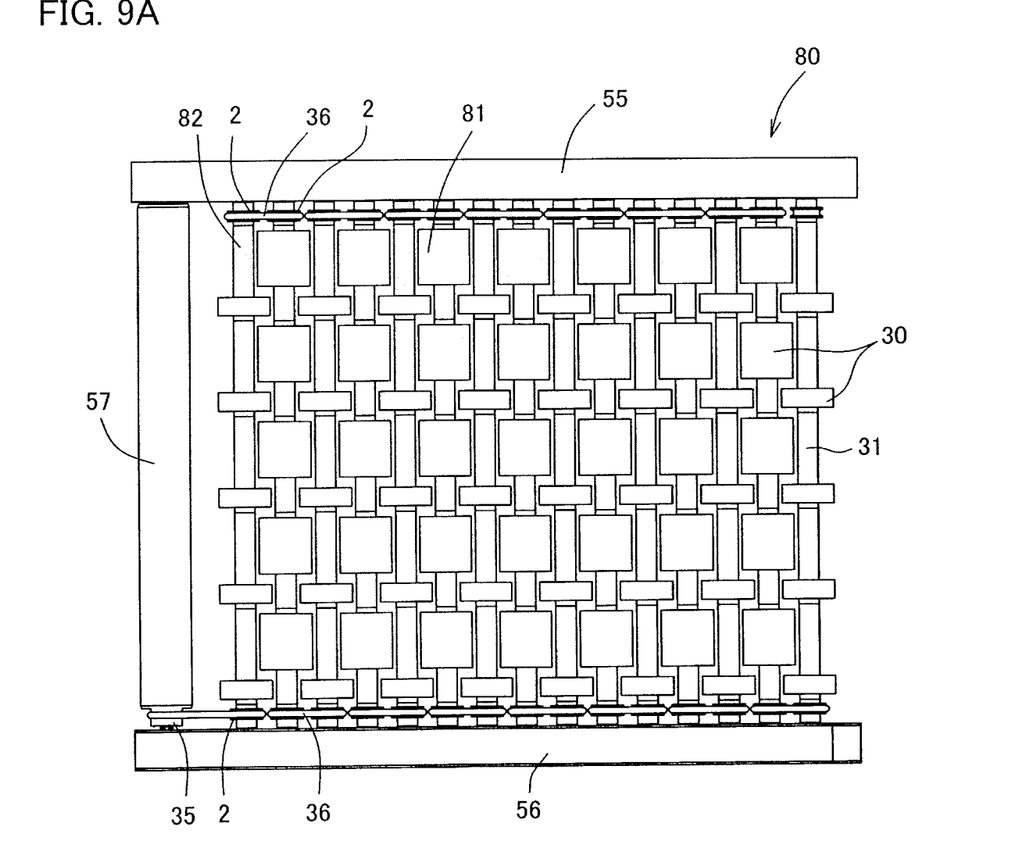
FIG. 9A is a plan view and FIG. 9B is a side view of an inclined conveyor device according to another embodiment of the present invention.
Figure 9B:
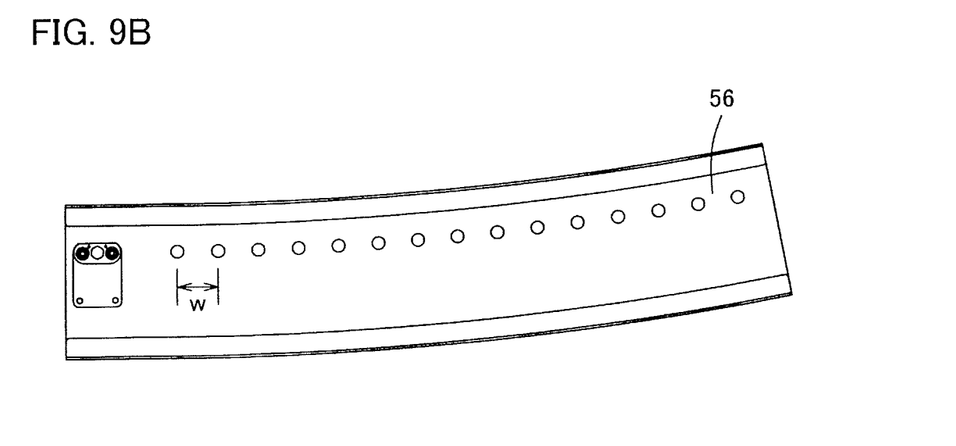

For example, in the conveyor device 80 illustrated in FIGS. 9A and 9B, the conveying rollers 81 having a large ratio of the large-diameter portion (force-applying region) 30 and the conveying rollers 82 having a small ratio of the large-diameter portion (force-applying region) 30 are alternately arranged.

In the conveyor device 80, the inter-shaft distance W between the adjacent conveying rollers 81 and 82 is also shorter than the diameter of the large-diameter portion 30.

In the embodiment described above, the blade-shaped piece 11 is illustrated as an example of the deformation unit, but the shape of the deformation unit is not limited to the blade-shaped shape.

FIGS. 10A, 10B, 10C, and 10D illustrate a modification example of the deformation unit.

Figure 10A:
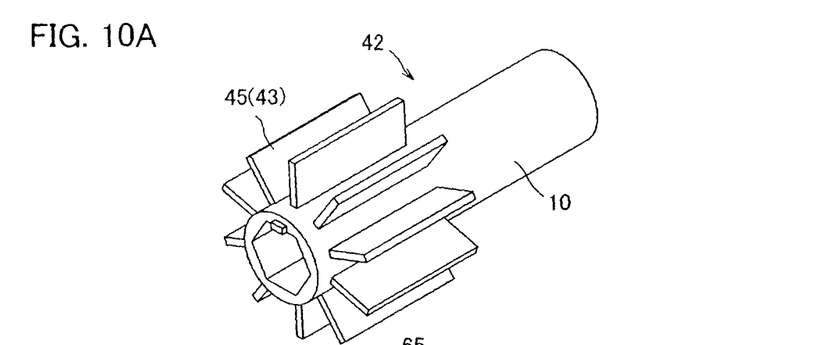
FIGS. 10A, 10B, 10C, and 10D are a perspective view of a roller piece according to other embodiments of the present invention.

The deformation unit 43 employed in the roller piece 42 illustrated in FIG. 10A is configured by a linear blade-shaped piece 45. The blade-shaped piece 45 of the roller piece 42 is provided in the normal direction with respect to the rotating core component (shaft portion) 10.

Figures 10B, 10C:
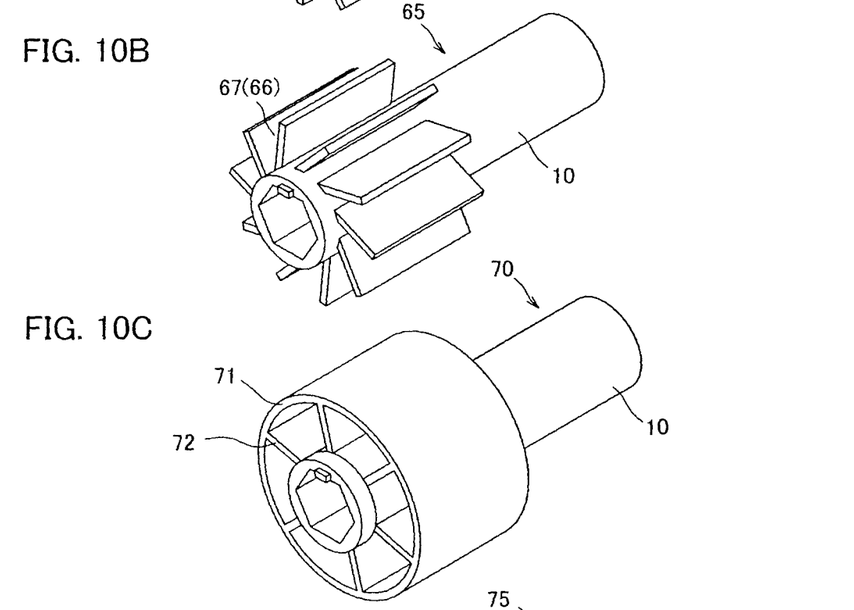

The deformation unit 66 employed in the roller piece 65 illustrated in FIG. 10B is configured by a linear blade-shaped piece 67. The blade-shaped piece 67 of the roller piece 65 is provided to have a component in the tangential direction with respect to the rotating core component (shaft portion) 10.

The deformation unit 71 employed in the roller piece 70 illustrated in FIG. 10C has a structure in which the free end sides of all the blade-shaped pieces 72 are connected to an annular part that comes into contact with objects to be moved. Cavities are provided between the annular part and the core member/shaft portion 10 to allow the annular part to be elastically deformed.

Figure 10D:
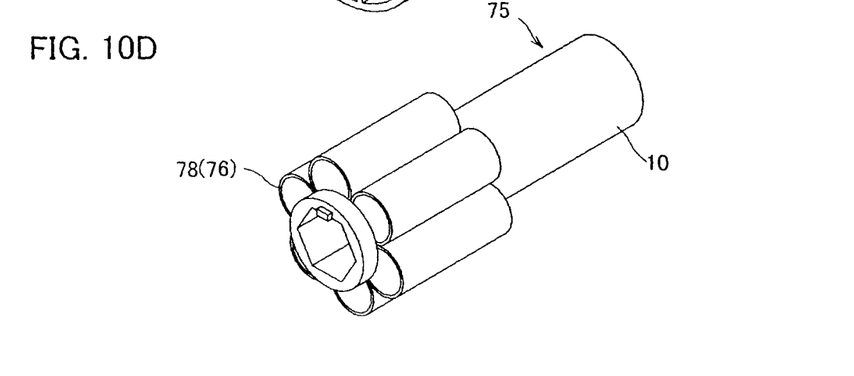

The deformation unit 76 employed in the roller piece 75 illustrated in FIG. 10D is configured by a blade-shaped piece 78 having a structure in which both ends are connected.

EXPLANATION OF REFERENCE NUMBERS 1, 81, 82: Conveying roller
5, 45, 65, 70, 75: Roller piece
6: Rotating core
10: Rotating core component (shaft portion)
11: Blade-shaped piece (deformation unit)
45, 67, 72, 78: Blade-shaped piece
15: Engaging unit
16: Engaging unit
20: Core member
30: Large-diameter portion (force-applying region)
31: Small-diameter portion (void region)
40: Inclined conveyor device
50: Upper conveyor device
51: Lower conveyor device 43, 66, 71, 76: Deformation unit
80: Conveyor device
L: Total length
W: Inter-shaft distance

The invention claimed is:

1. A conveying roller that is rotated with power, thereby applying force to an object on the conveying roller to move the object, the conveying roller comprising:
a large-diameter portion and a small-diameter portion, the large-diameter portion comprising:
a core member; and
a deformation unit elastically deformable and provided around the core member,
the deformation unit comprising:
a cavity; and
an annular part that comes into contact with the object, the cavity being provided between the annular part and the core member to allow the annular part to be elastically deformable.

2. The conveying roller according to claim 1, comprising a plurality of roller pieces, the roller piece on the large-diameter portion including: a shaft portion; and the deformation unit, the deformation unit being provided on the shaft portion.

3. A conveyor device comprising conveying rollers arranged in parallel, the conveyor device rotating the conveying rollers with power, thereby applying force to an object on the conveying rollers to move the object,
wherein the conveying rollers include: a first conveying roller; and a second conveying roller adjacent to the first conveying roller,
wherein the first conveying roller includes: a first large-diameter portion; and a first small-diameter portion, and the second conveying roller includes: a second large-diameter portion; and a second small-diameter portion,
the first large-diameter portion being located at a position corresponding to the second small-diameter portion,
the first small-diameter portion being located at a position corresponding to the second large-diameter portion, and
wherein an inter-shaft distance between the first and the second conveying rollers is shorter than a diameter of the first large-diameter portion and that of the second large-diameter portion,
the first and second large-diameter portions each comprising:
a core member; and
a deformation unit provided around the core member, the deformation unit comprising:
a cavity; and
an annular part that comes into contact with the object, the cavity being provided between the annular part and the core member to allow the deformation unit to be elastically deformable.

4. The conveying roller according to claim 1, including in a shaft direction:
a force-applying region contributing to conveyance of the object; and
a void region not contributing to conveyance of the object.

5. The conveying roller according to claim 1, comprising a plurality of roller pieces, the roller pieces arranged to define:
a force-applying region contributing to conveyance of the object; and
a void region not contributing to conveyance of the object.

6. A conveyor device including multiple conveying rollers according to claim 1 arranged in parallel.

7. The conveyor device according to claim 6,
wherein the conveyor device includes: a first conveying roller; and a second conveying roller adjacent to the first conveying roller,
wherein the first conveying roller includes: a first large-diameter portion; and a first small-diameter portion, and the second conveying roller includes: a second large-diameter portion; and a second small-diameter portion,
the first large-diameter portion being located at a position corresponding to the second small-diameter portion,
the first small-diameter portion being located at a position corresponding to the second large-diameter portion, and
wherein an inter-shaft distance between the first and the second conveying rollers is shorter than a diameter of the first large-diameter portion and that of the second large-diameter portion.

8. An inclined conveyor device installed in an inclined posture, comprising: an intermediate region; and at least one of an upper-end region and a lower-end region,
wherein the conveyor device according to claim 6 is provided in the at least one of the upper-end region and the lower-end region.

* * * * *